United States Patent [19]
Jeter

[11] 3,866,678
[45] Feb. 18, 1975

[54] APPARATUS FOR EMPLOYING A PORTION OF AN ELECTRICALLY CONDUCTIVE FLUID FLOWING IN A PIPELINE AS AN ELECTRICAL CONDUCTOR

[75] Inventor: John D. Jeter, Dallas, Tex.
[73] Assignee: Texas Dynamatics, Inc., Dallas, Tex.
[22] Filed: Mar. 15, 1973
[21] Appl. No.: 341,771

[52] U.S. Cl. ............ 166/66, 174/8, 174/9 F, 174/47, 175/104, 285/48, 285/55, 285/355, 324/1, 340/18 LD
[51] Int. Cl. ............ E21b 7/00, E21b 41/00, H01b
[58] Field of Search ........ 174/1, 8, 9 F, 15 R, 15 C, 174/30, 47; 166/65 R, 66, 242; 175/104; 340/18 CM, 18 LD; 204/219, 220; 418/48; 73/151; 324/1

[56] References Cited
UNITED STATES PATENTS
2,547,440  4/1951  Clark et al. ........................... 174/8
3,400,055  9/1968  Messner ........................ 174/9 F X
3,499,829  3/1970  Messner et al. ..................... 204/219

Primary Examiner—Laramie E. Askin
Attorney, Agent, or Firm—Bargfrade and Thompson

[57] ABSTRACT

A method and apparatus is disclosed that uses fluid flowing through a conduit as a conductor of electricity. The conduit is of non-conducting material or is lined with insulating material to provide a conduit of non-conductive material. Electrical insulators are located at each end of the conducting portion of the conduit to electrically insulate the fluid in the conducting portion from the remaining fluid in the conduit, while allowing fluid to flow through the conduit.

5 Claims, 10 Drawing Figures

PATENTED FEB 18 1975
3,866,678
SHEET 1 OF 3
FIG. 1A
FIG. 1B
FIG. 1C
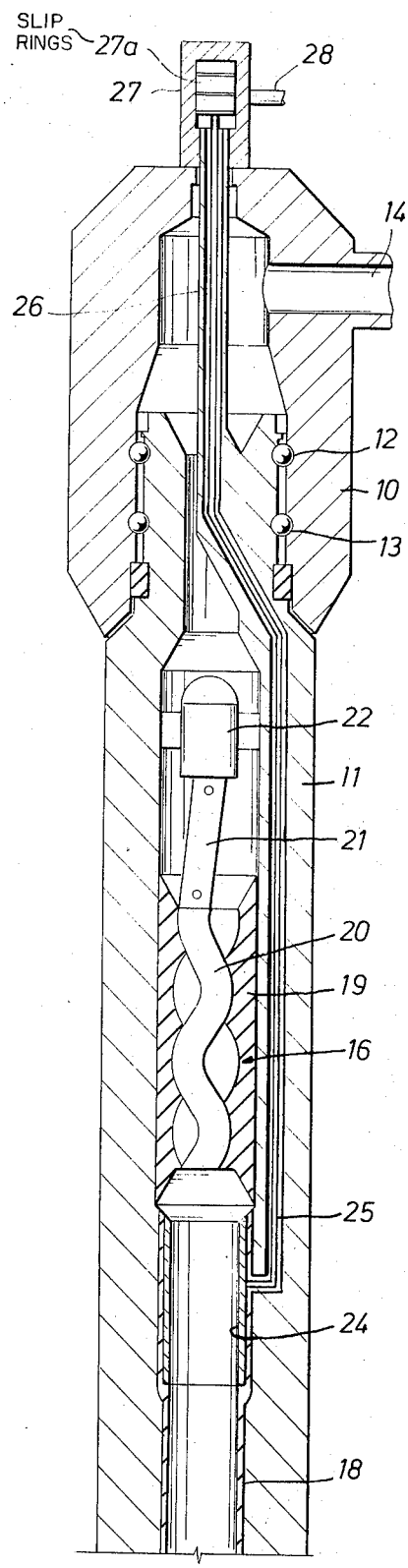
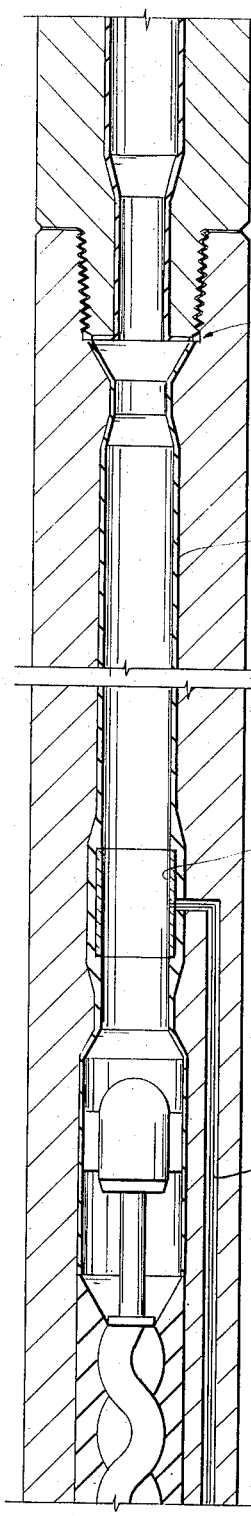
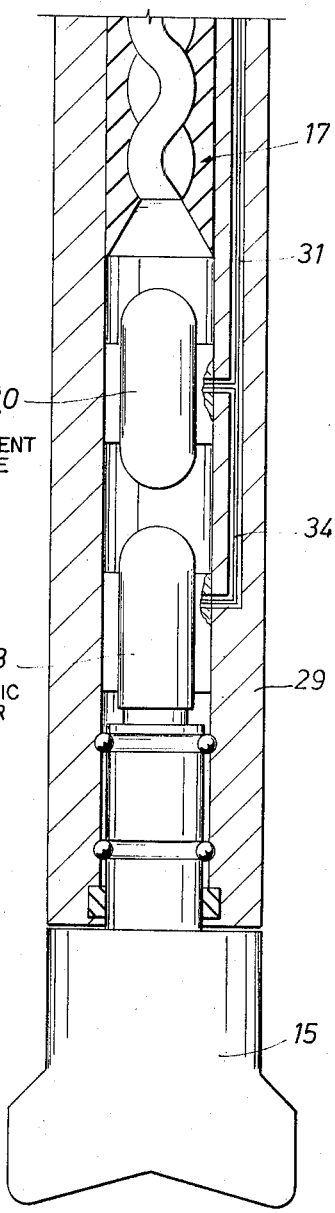

APPARATUS FOR EMPLOYING A PORTION OF AN ELECTRICALLY CONDUCTIVE FLUID FLOWING IN A PIPELINE AS AN ELECTRICAL CONDUCTOR

This invention relates to a method of and apparatus for conducting electricity.

There are many instances where an electric cable extends along a pipeline to transmit power or information. The cable may connect pump stations along a cross-country pipeline or connect devices located in a well bore on a pipe string to the surface. In the latter instance, the use of a cable for this purpose is so inconvenient that it is rarely done although it is advantageous to use electric devices downhole. For example, using an electric motor to rotate a drill bit has advantages over other downhole motors. Also, information about conditions at the bottom of a well bore could easily be measured and transmitted to the surface if a conductor for the electric signals was available.

As indicated above, however, electric cables are used with a drill string very seldom, primarily because the advantages gained usually do not offset the cost of obtaining them. For example, the cable must be run after the pipe string is in the well bore and removed before the pipe can be pulled out of the well bore to change drill bits, or to simply add a joint of pipe to the string. It requires special equipment at the surface to accommodate the cable while allowing the pipe to rotate. In general, drilling operations are slowed down to the point where most operations cannot justify the increased cost.

Many pipelines carry fluid that is electrically conductive. Most drilling muds, for example, are electrically conductive.

It is an object of this invention to provide a method of employing the electrically conductive fluid flowing in a pipeline as a conductor of electrical energy.

It is another object of this invention to provide an electrical conductor that employs a portion of the electrically conductive fluid flowing through a pipeline as an electrical conductor with that portion electrically insulated from the rest of the fluid flowing through the pipeline.

It is another object of this invention to provide a method of and apparatus for employing a portion of the electrically conductive fluid in a pipeline to serve as a conductor of electricity without interferring with the flow of fluid through the pipeline.

It is another object of this invention to provide apparatus for filling any gaps between the internal coating of insulating material on adjacent joints of pipe to insure continuity of the coating of insulation across threaded connections.

These and other objects, advantages, and features of this invention will be apparent to those skilled in the art from a consideration of this specification, including the attached drawings and appended claims.

In the drawings:

FIGS. 1A, 1B, and 1C, are vertical sectional views through a conduit or pipe string arranged in accordance with this invention to be used in a well bore and to establish an electrical connection from the surface to downhole devices carried by the pipe string through the fluid in the pipe string;

Figure 8:
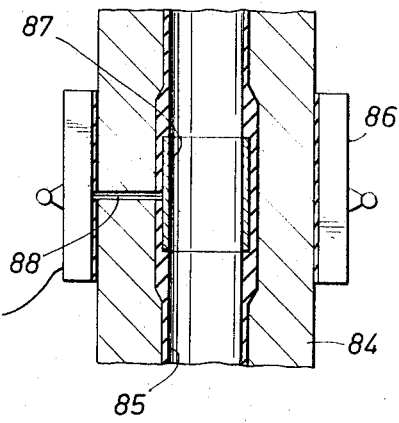
Figure 7:
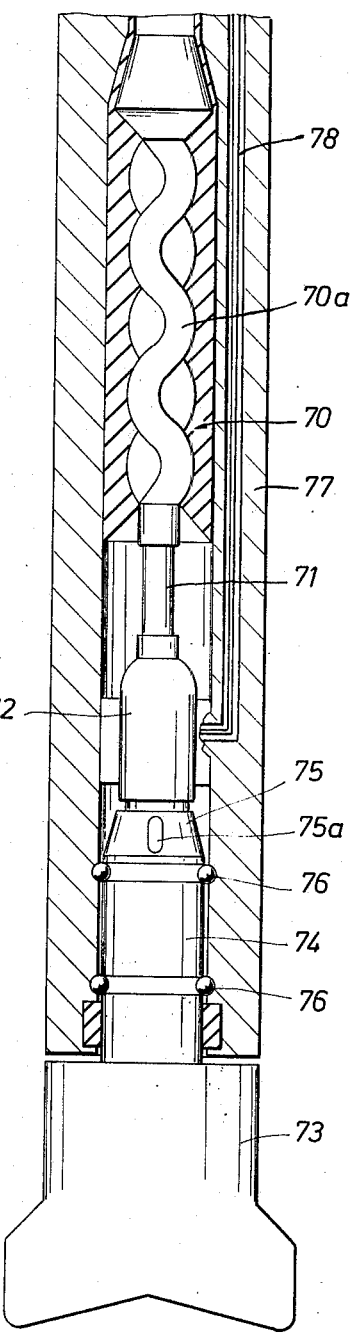

FIG. 7 is a vertical sectional view through the lower end of a drill string equipped with an electric motor for driving the drill bit with some of the power of the bit also being supplied by a fluid powered downhole motor; and FIG. 8 is a view partially in section of apparatus for providing communication between downhole devices and the surface, using radiant energy instead of physical conductors connected to the drill string.

FIG. 1A, FIG. 1B, and FIG. 1C, show a drill string embodying the apparatus in this invention to provide an electrical connection between the surface and the bottom of the drill string. The drill string is supported and rotated by a drilling rig located at the surface in the conventional manner, but this equipment is not shown. Swivel 10 is connected to joint 11, the top joint in the drill string, usually a Kelly joint, to allow the drill string to be rotated relative to the swivel. Conventionally, the drill string is also supported by the swivel. The bearings for allowing the relative rotation of the pipe and the swivel while the pipe is supported thereby are shown schematically by bearings 12 and 13. Drilling mud is pumped into the drill string through opening 14 in the side of the swivel. This drilling mud travels down through the bore of the drill string and out the bottom thereof through drilling bit 15. This is the conventional circulation. Of course, mud can be circulated in the other direction, but in either event will be flowing through the bore of the drill string.

In accordance with the method of this invention, a section of a conduit or pipeline carrying an electrically conductive fluid is electrically insulated from the fluid flowing in the section and the fluid upstream and downstream of the section while the fluid in the section is connected into an electric circuit. The apparatus for practicing this method is shown in FIGS. 1A, 1B, and 1C as used with a drill string. It includes a conduit of non-conductive material through which the electrically conductive fluid flows. The apparatus is also provided with insulating means located in the conduit at spaced points through which the conductive fluid can flow to electrically insulate the fluid in the conduit between the insulating means from the fluid on the opposite sides thereof. In the embodiment shown, first or upper insulating means 16 is located in the pipe string, preferably in Kelly 11, below swivel 10. This keeps the upper insulating means in the top joint of the string even though additional joints are added. Second, or lower, insulating means 17 is located in the drill string, preferably adjacent the electrical devices to be connected to the electrically conductive portion of the fluid flowing through the conduit.

Between the two insulating means, the fluid in the pipeline must be electrically insulated from its surroundings. Therefore, the fluid flows through a conduit of non-conductive material. Usually pipelines are made of steel, which is electrically conductive, so to insulate the fluid, the pipe must be coated internally with a non-conducting material. In the embodiment shown, this is liner 18 of non-conductive material that extends throughout the bore of the drill string between the two insulating means 16 and 17 and forms a conduit of non-conductive material. Drill pipe used in drill strings is often internally coated at the present time for other purposes. The coating is usually a plastic material that adheres to the bore of the pipe. This material is a good electrical insulator, and thus can be used to form the electrically non-conductive conduit to electrically insulate the fluid in the bore of the drill string from the pipe that makes up the drill string. Since most drill strings are made up of a plurality of joints of pipe that are connected together by threaded connections, means should be provided to insure the continuity of the insulation between pipe joints and one way of accomplishing this is described below.

With the arrangement described above, then, the fluid flowing through the bore of the drill string between insulating means 16 and 17 will provide a conductor for electrical energy, if the fluid is electrically conductive, and most drilling fluids are reasonably good conductors. The insulating means must allow the flow of fluid while, at the same time, electrically insulating the fluid on one side from the fluid on the other. In the embodiment shown in FIGS. 1A, 1B, and 1C, insulating means 16 and 17 comprise positive displacement motors that cause the fluid to flow through the motors in discrete isolated pockets. By breaking up the continuity of the fluid stream, electrical energy cannot flow through the motors. The particular type shown in the drawings is commonly referred to as a Moyno pump or Moyno motor. The upper motor includes body 19 of a resilient electrically non-conductive material, such as rubber, and rotor 20, designed to be rotated within body 19 by the flow of fluid through the body when the device acts as a motor. Rotor 20 must be either made of a non-conductive material or it must be coated with a non-conductive material so that electricity cannot flow from the fluid on one side through the rotor to the fluid on the other side. Since usually the rotor not only rotates but orbits the motor centerline, it is usually supported by flexible shaft 21 that, in turn, is supported by bearings (not shown) located in bearing housing 22. The above description of insulating means 16 applies equally to insulating means 17 where, again, a Moyno motor is employed for that purpose.

To connect the fluid in the pipe string into an electrical circuit, electrodes are placed in electrical contact with the fluid between which electrical energy can flow through the conductive fluid. In the embodiment shown, cylindrical electrode 24 is located in the drill string just below insulating motor 16. Conventional electrical conductors 25 are located in the wall of upper joint 11 of the drill string. These conductors pass through swivel 10 along its central axis through extension rod 26 that is located on the central axis of the swivel. The rod extends out the upper end of the swivel and into slip ring housing 27 located on top of the swivel. Slip rings 27a of conventional design are provided to electrically connect conductors 25 with conductor 28 while allowing relative rotation of rod 26 and conductors 25 with slip ring housing 27 and conductor 28. Suitable bearings and seal rings (not shown) are provided for this relative rotation. With this arrangement, electrode 24 is electrically connected with conductor 28 for either supplying power to the fluid in the conduit formed by liner 18 or for receiving electrical signals transmitted upwardly through the fluid to electrode 24 from electrical devices carried by the drill string.

Such a device may be in the form of instrument package 30 located in the drill string immediately above the drill bit. Such a package may contain devices for sensing the orientation of the well bore, the inclination thereof, the temperature at that point in the drill string, and the pressure of the bottom drilling fluid. In addition, such a package could contain apparatus for measuring the speed of rotation of a drill bit when the bit is being powered by a downhole motor. All of this information could be transmitted to the surface in the form of electrical signals. As shown, the electrical connection between the instrument package and the fluid in the pipe string is completed by electrical conductors 31 located in the wall of pipe joint 29 and connected to cylindrical electrode 32 located just above the lower insulating means 17 in electrical contact with the fluid.

The electrically conductive fluid flowing between the insulating means constitutes one conductor, but by multiplexing signals imposed thereon, many different bits of information can be transmitted over this one conductor.

In addition, or alternatively, electric motor 33 could be supplied with power transmitted though the fluid in the bore of the drill string to electrode 32 and electrical conductors 34.

Figure 4:
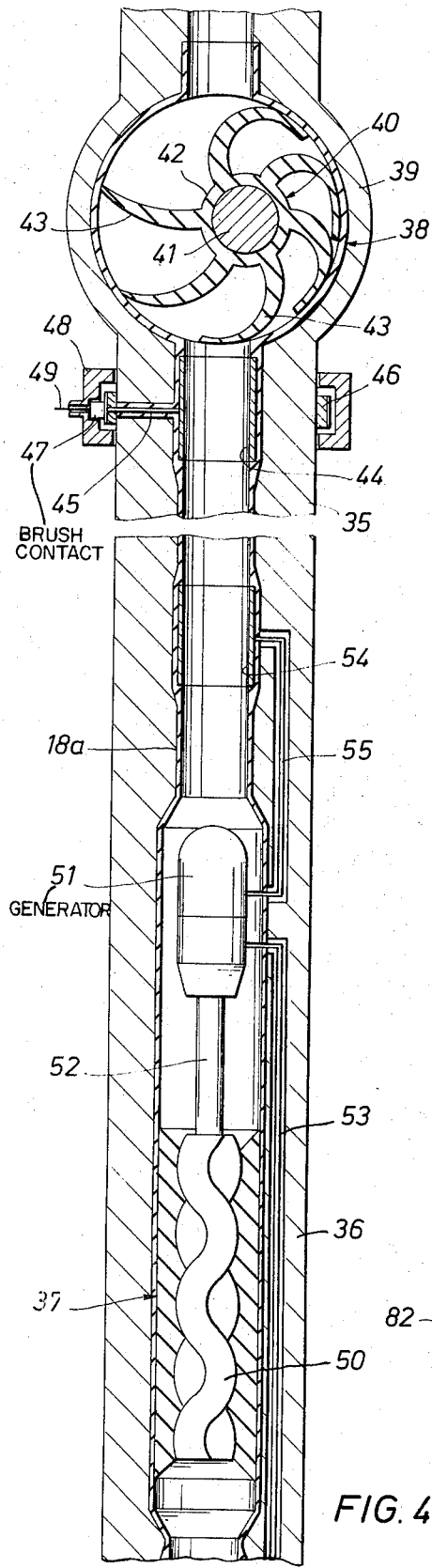
FIG. 4 is a vertical sectional view through an alternate embodiment of the electrical conductor of this invention.

FIG. 4 is an alternate embodiment of the invention. Shown is a portion of the upper joint or Kelly 35 and one of the lower joints 36. In between, of course, are a plurality of threadedly connected joints of pipe, all of which are insulated internally by sheath or conduit 18a of non-conductive material. In this embodiment, lower insulating means 37 comprises the Moyno motor described above. Upper insulating means 38, however, is a different type of positive displacement motor. It includes housing or stator portion 39 and rotor 40. The inner wall of housing or stator portion 39 is lined with non-conductive material similar to that of liner 18a to electrically insulate the stator from the fluid flowing therethrough. Rotor 40 includes central shaft 41 upon which is mounted a cylindrical member 42 of elastomeric material having a plurality of arms 43 extending radially therefrom. This particular type of structure is commonly used as a pump where power is supplied to shaft 41 to rotate arms 43 within the housing to move fluid therethrough. As shown, the rotor is free to rotate under the influence of the drilling mud pumped through the housing into the drill string, but it serves to divide the drilling fluid into discrete separate pockets of fluid and thereby insulates electrically the fluid in each pocket so that the flow of electrical energy through the fluid in the motor is prohibited.

It is another feature of this embodiment to provide an electrical connection between the conducting fluid and the outside of the pipe string in a manner that does not require a modification of the swivel commonly used to support Kelly 35 during drilling operations. As shown, cylindrical electrode 44 is located inside the bore of the drill string in contact with the fluid flowing therethrough. Conductor 45 connects the electrode to ring 46 that rotates with the pipe. Brush 47 is mounted in housing 48 in sliding contact with ring 46. Conductor 49, then, can supply electrical energy to the fluid or receive electrical signals from the fluid while the pipe and ring 46 are rotating relative to brush 47 and housing 48.

Since the drilling fluid flowing through the insulating means, such as Moyno motor type insulator 37 in FIG. 4, will cause the rotor of the motor to rotate relative to the stator, this can be used, if desired, to provide a source of power. For example, as shown in FIG. 4, rotor 50 is connected to electrical generator 51 by shaft 52. Some means are necessary to support the rotor in any event, and, as shown, some of the energy in the drilling fluid as it passes through the motor can be converted to electrical energy by causing it to drive generator 51. The output of this generator can be connected to downhole devices through conductor 53, or it can be used to amplify the signals received from the downhole devices through conductor 53 before they are transmitted to electrode 54 through conductor 55.

Figure 2:
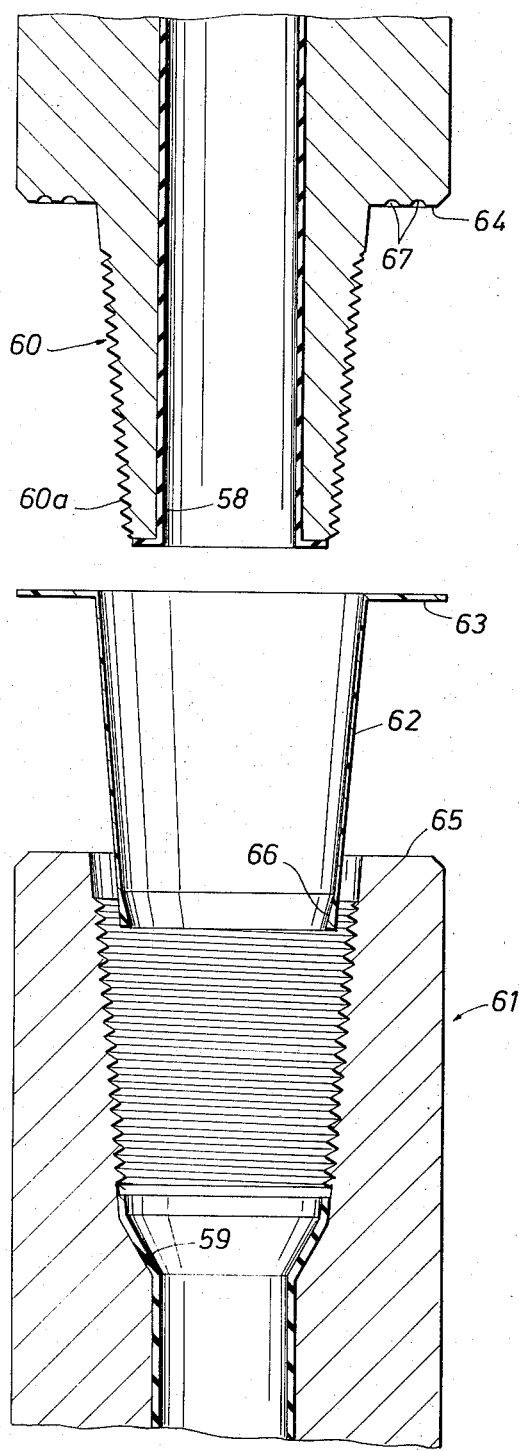
FIG. 2 is a vertical sectional view of a tool joint for use in the pipe string of FIGS. 1A, 1B, and 1C, prior to its being made up.
Figure 3:
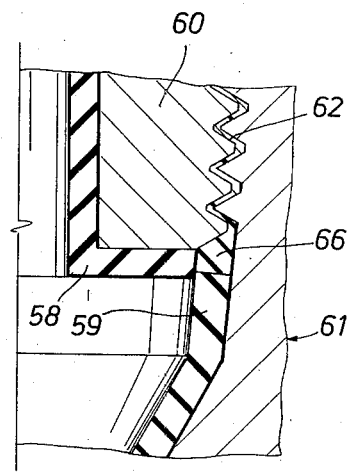
FIG. 3 is a view on an enlarged scale of the portion of the pipe joint at the location 3 of FIG. 1B.

As stated above, the electrically conductive fluid flows through a conduit of non-conductive material. Where the conduit comprises a lining on the inside of a plurality of joints of steel pipe, such as joints of drill pipe in a drill string, it is important that the continuity of the conduit of nonconductive material be maintained at each threaded connection. In FIG. 2, the threaded portions on the ends of two joints of pipe are shown. This particular connection is typical of the type used in connecting drill pipe together in a drill string. It consists of male or pin connection 60 and female or box connection 61. Liner 58 can be brought around the the lower end of pin 60 to about the root of thread 60a. On the other joint, liner 59 can extend to just below the last thread of the box. It is one of the features of this invention to provide apparatus for filling any gaps between the ends of the liners of two joints when they are connected together. As shown in FIG. 2, tapered sleeve 62 is designed to match the taper of the threads in box 61. Outwardly extending flange 63 on the upper end of sleeve 62 engages shoulder 65 on the box, and positions the sleeve in the box. The wall of sleeve 62 is generally uniform in thickness, except at the lower end it tapers inwardly to provide a wedge-shaped portion 66, which is designed to be positioned just above the upper end of liner 59 in box 61 when the sleeve is placed in the box. Sleeve 62 is made of an extrudible electrically non-conductive material. Preferably, it also should provide lubrication between the threads as they are made up and also serve to seal the joint from fluid leaks as well as electrical leaks. Polytetrafluoroethylene is one such material that would serve this purpose. After the sleeve is dropped in place and pin 60 is made up in box 61 in the conventional manner, wedge 66 at the lower end of the sleeve will be extruded downwardly as the pin and box are made up to fill the space between the upper end of liner 59 in the box and the lower end of liner 58 on the pin to insure that the liner is continuous between the two joints, as shown in FIG. 3. The portion 66 should contain enough material to be extruded between the adjacent ends of the liner with sufficient force to exclude any fluid from between the contacting surfaces of portion 66 in the liner to insure that no path for electrical leakage is provided.

An additional feature or advantage is obtained with sleeve 62 through its flange 63. One or both of mating shoulders 64 and 65 can be provided with annular grooves 67, such as the grooves shown in shoulder 64. Since, in order to provide rigidity to the drill string, shoulders 64 and 65 must make metal-to-metal contact, flange 63 is designed to be forced into groove 67 when the joint is made up with the recommended torque. These grooves, then, are filled with a material, such as polytetrafluoroethylene, that will act as concentric O-rings to further insure a fluid seal between the two joints.

As explained above, fluid powered downhole positive displacement motors are convenient means for electrically insulating the fluid in the drill string so that it can be used as a conductor. Also, as explained above, it is possible to use the downhole motor also to provide some power. As shown in FIG. 7, lower insulator 70 is of the Moyno motor type, and it is mounted in the drill string with its rotor 70a connected to shaft 71. Shaft 71 can be connected to the rotor of an electric motor mounted in housing 72 to combine with the electric motor to drive drill bit 73. Lantern 75 is included with hollow shaft 74 so that drilling fluid can enter through ports 75a to reach the bit in the conventional manner. Bearings 76 support output shaft 74 for rotation relative to bottom joint 77 of the drill string. Electrical power is supplied to the electric motor through conductor 78 which is connected to an electrode in the conducting fluid above lower insulating means 70.

With such an arrangement, the Moyno motor could be used to provide the additional power required to rotate the bit, where for some reason it is not possible to supply the electric motor with enough power. The Moyno motor has the additional advantage of providing high torque at low speeds, which may not be the case with some electric motors. Therefore, with this combination one can obtain the high torque at low speed of the Moyno motor and the relatively high torque at higher speed of the electric motor.

Figure 6:
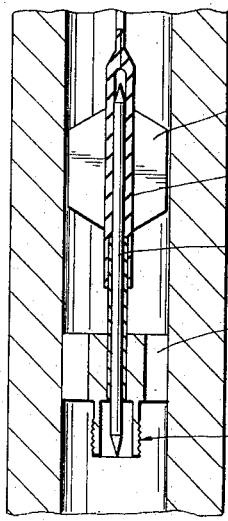
FIG. 6 is a cross sectional view of apparatus to pick up electrical signals carried by the fluid flowing through the drill string.

In FIG. 6 an arrangement is shown whereby electrical energy containing information from downhole devices can be picked up as it flows through the fluid in the conduit for transmission to readout and other devices located at the surface. As shown, coil 80 is located in a portion of increased thickness of liner 81 of non-conductive material located on the inner bore of pipe 82. Assume, for example, that this is a portion of the upper end of a drill string and no upper insulating means is provided, so consequently the electrical energy being transmitted through the fluid in the bore of the drill string will travel through the insulating conduit or liner 81 until it reaches a conductive material where it will be connected to ground. As the electrical energy passes coil 80, however, it will induce current in the coil proportional to the flow of energy. If this energy is an alternating current signal, a replica of this will be induced in the coil and it can be connected by conductor 83 to the appropriate readout instruments.

The apparatus of FIG. 8 can be used to transmit information carried by electrical signals traveling to the surface through the fluid in the bore of the drill string. This arrangement is advantageous in that it requires no wires to be connected to the drill string which often complicates the structure since the drill string is usually rotating even though a downhole motor is being used to drive the bit. As shown, section 84 of the drill pipe, preferably the Kelly, is electrically insulated from the fluid therein by liner 85. Mounted on Kelly 84 for rotation therewith is transmitter 86. Cylindrical electrode 87 located below the upper insulating means (not shown) connects the fluid in the Kelly to transmitter 86 through conductor 88. The transmission of the information may be through radio frequency signals, light signals, or audio signals. In any event, it is energy radiated from the transmitter so that there are no wires connected between the Kelly and the readout instruments.

In addition to transmitting the information, transmitter 86 could include a receiver to receive information by RF transmission, which, in turn, would be amplified, if necessary, and supplied directly to the conductive fluid in the bore of Kelly 84. The power for accomplishing the transmitting of the information and receiving of the information could be supplied by batteries, or, as explained above, by having the upper insulating means, if it is a positive displacement motor, drive a generator.

As explained above, the major objection to the use of an insulated conventional electrical conductor is the difficulty in handling the conductor at the surface. It may be advantageous, however, to combine the fluid conducting conduit of this invention and a conventional electric cable. For example, if the liner on the inside of the drill pipe that electrically insulates the drill pipe from the fluid flowing therethrough has a temperature limitation, it may be necessary to limit the depth at which the lined drill pipe is used, and from that point down use a conventional cable. With this arrangement, the problem of adding joints to the drill string is eliminated and there would be no problem of rotation of the drill string. Another advantage of this system may be that the length of the fluid conducting section could be reduced, thereby reducing the number of joints of insulated pipe that has to be used in a given drill string.

Figure 5:
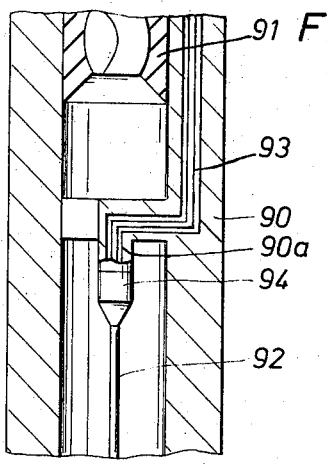
FIG. 5 is a view of apparatus combining the fluid electrical conductor of FIGS. 1 and 4 with conventional suspended conductor cable in a drill string.

In FIG. 5, the portion of the drill string comprising housing 90 of lower insulating means 91, includes electrical conductor 93 which is connected to the electrode (not shown) located in the fluid above the lower insulating means. The other end of conductor 93 is connected to cable 92 through connector 94 that not only electrically connects conductor 92 to conductor 93, but also physically connects cable 92 to spider 90a to support the weight of the cable. The lower end of cable 92 is electrically connected to the downhole devices by a bayonnet connection comprising spider 95 having a threaded connection 96 to which the electric downhole device (not shown) is connected. Spider 95 supports bayonnet 97. Socket 98 is connected to the lower end of cable 92 and is guided into position to slide over bayonnet 97 by guides 99. The socket is of resilient, non-conducting material, such as rubber, to electrically and physically insulate the bayonnet from the fluid in the pipe while electrically connecting the bayonnet to the conductors in cable 92.

In operation, the section of the drill string just below the position where the first or lower insulating means is to be positioned is run in the hole. Cable 92 is lowered through the bore of the drill string until the bayonnet connection between the lower end of the cable and the device to be powered has been made. The upper end of the cable is connected to conductors 93 in housing 90 by plug 94. Housing 90, then, is connected into the drill string in the conventional way.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. Apparatus for conducting electrical energy comprising a conduit of non-conducting material through which an electrically conductive fluid flows and insulating means located in the conduit at spaced points through which the conductive fluid can flow for electrically insulating the fluid in the conduit between the spaced insulating means from the fluid on the opposite sides thereof, said insulating means comprising a stator located in the conduit through which the fluid in the conduit can flow in non-conducting relationship with the fluid flowing between the spaced insulating means and a rotor located in the stator in non-conducting relationship with the fluid flowing between the spaced insulating means, each said rotor being rotated by the fluid flowing through its associated stator to separate the fluid moving through the stator into electrically isolated pockets to prevent the flow of electricity between the fluid in the conduit on opposite sides of the stator, and a generator of electrical energy connected to the rotor of one of the spaced insulating means to supply electrical energy when the rotor is rotated by the fluid flowing through the conduit.

2. Apparatus for conducting electrical energy through a well bore comprising a pipe string located in a well bore having a coating of non-conducting material on the inner surface thereof through which an electrically conductive fluid flows and insulating means located in the pipe string at spaced points through which the conductive fluid can flow for electrically insulating the fluid in the pipe string between the spaced insulating means from the fluid on the opposite sides thereof.

3. Apparatus for electrically connecting a downhole device carried by a pipe string containing conductive fluid to the surface comprising insulating means located in the pipe string adjacent the upper end thereof and adjacent the lower end for electrically insulating the fluid in the pipe string between the insulating means from the fluid above and below said insulating means while permitting fluid to flow in the pipe string, means electrically insulating the pipe string from the fluid between the upper and lower insulating means, means electrically connecting the downhole device and the fluid in the pipe string above the lower insulating means and means electrically connecting the fluid in the pipe string below the upper insulating means to the surface whereby electrical energy can be transmitted between the surface and the downhole device through the fluid in the pipe string between the upper and lower insulating means.

4. The apparatus of claim 3 in which each insulating means comprises a stator located in the pipe string through which the fluid in the pipe string can flow, said stator being in non-conducting relationship with the fluid, and a rotor located in the stator in nonconductive relationship with the fluid flowing through the stator, said rotor being rotated by the fluid flowing through the stator to separate the fluid moving through the stator into electrically isolated pockets to prevent the flow of electricity between the fluid in the pipe string on opposite sides of the stator.

5. The apparatus of claim 3 in which the pipe string includes a plurality of joints of pipe connected together by threaded connections and the means electrically insulating the pipe string from the fluid therein includes a coating of electrically non-conductive material on the inner wall of each pipe joint and a body of non-conductive material that is extruded into sealing engagement with the coatings on each adjacent joint when the joints are connected together.

* * * * *